(12) United States Patent
Brown et al.

(10) Patent No.: US 10,844,144 B2
(45) Date of Patent: Nov. 24, 2020

(54) NON ADIABATIC 2-PHASE (LIQUID-LIQUID) POLYMERIZATION PROCESS

(71) Applicant: NOVA Chemicals (International) S.A., Fribourg (CH)

(72) Inventors: Stephen Brown, Calgary (CA); Yves Lacombe, Calgary (CA); Brian Molloy, Airdrie (CA); Lawrence VanAsseldonk, Sarnia (CA); Stephen Salomons, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 112 days.

(21) Appl. No.: 15/981,935

(22) Filed: May 17, 2018

(65) Prior Publication Data
US 2018/0346610 A1 Dec. 6, 2018

(30) Foreign Application Priority Data
May 30, 2017 (CA) ..................................... 2969280

(51) Int. Cl.
*C08F 10/00* (2006.01)
*C08F 210/16* (2006.01)
*C08F 2/14* (2006.01)
*C08F 2/06* (2006.01)
*C08F 10/02* (2006.01)
*B01J 19/00* (2006.01)

(52) U.S. Cl.
CPC ............. *C08F 2/14* (2013.01); *B01J 19/0013* (2013.01); *C08F 2/06* (2013.01); *C08F 10/02* (2013.01); *C08F 210/16* (2013.01); *B01J 2219/00481* (2013.01); *B01J 2219/00961* (2013.01)

(58) Field of Classification Search
CPC .... C08F 2/01; C08F 2/04; C08F 10/02; C08F 2400/02
See application file for complete search history.

(56) References Cited

U.S. PATENT DOCUMENTS

| | | | |
|---|---|---|---|
| 4,433,121 A * | 2/1984 | Kabu | C08F 10/00 526/68 |
| 5,589,555 A | 12/1996 | Zboril et al. | |
| 6,255,410 B1 * | 7/2001 | Shigekauzu | C08F 10/00 526/160 |
| 9,388,254 B2 * | 7/2016 | Deshpande | C08F 210/16 |

FOREIGN PATENT DOCUMENTS

| | | |
|---|---|---|
| EP | 0 069 593 A2 | 1/1983 |
| WO | 93/11171 A1 | 6/1993 |
| WO | 97/36942 A1 | 10/1997 |
| WO | 2012/088235 A2 | 6/2012 |

* cited by examiner

*Primary Examiner* — Rip A Lee
(74) *Attorney, Agent, or Firm* — Thomas J. Styslinger

(57) ABSTRACT

Disclosed are methods and conditions for manufacturing a polyethylene polymer or copolymer in a liquid/liquid biphasic non-adiabatic reaction, and the compositions and articles made therefrom.

19 Claims, 1 Drawing Sheet

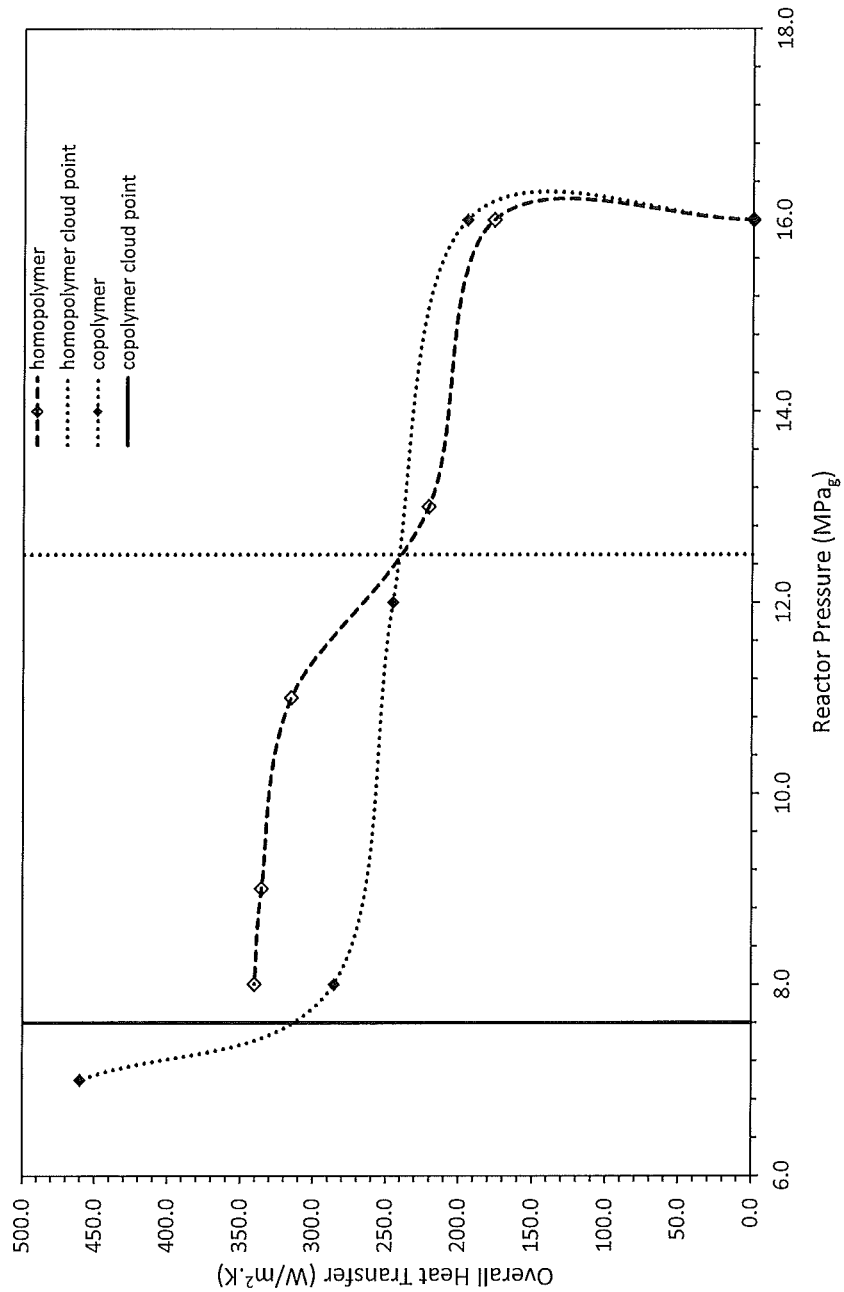

NON ADIABATIC 2-PHASE (LIQUID-LIQUID) POLYMERIZATION PROCESS

Disclosed herein is the use of a non-adiabatic polymerization reactor that is operated at pressures that allow the reaction fluid to exist in two liquid phases in the reactor. The 2-phase system can improve heat transfer to the cooling medium.

While there are known uses of cooled (or non-adiabatic) reactors for solution polymerization and there are known processes for polymerization in the liquid/liquid (L/L) region of the phase diagram the present disclosure seeks to combine the two approaches in new ways.

Some embodiments disclosed herein are continuous processes for manufacturing a polyethylene polymer or copolymer in a liquid/liquid biphasic non-adiabatic reaction comprising the steps of
   a. identifying the desired polymer or copolymer product;
   b. charging a non-adiabatic reactor with starting materials and reactants required to obtain the desired polymer or copolymer product;
   c. adding a solvent chosen from aliphatic cyclic, straight and branched $C_{3-12}$ hydrocarbon solvents that will facilitate formation of the liquid/liquid biphase;
   d. setting and maintaining the reaction temperature required to obtain the desired polymer or copolymer product;
   e. controlling the pressure to retain liquid/liquid bi-phase allowing for optimized heat transfer to a cooling medium; and
   f. optionally monitoring at least one physical property of the reaction mixture to confirm the liquid/liquid biphasic reaction is being maintained
   wherein the continuous process allows for heat transfer to the cooling medium that is improved relative to a process for making the same polymer in a single liquid phase.

Some embodiments disclosed herein are methods to improve the heat transfer to the cooling medium in a continuous process for manufacturing a polyethylene polymer or copolymer, the methods comprising
   a. identifying the desired polymer or copolymer product;
   b. charging a non-adiabatic reactor with starting materials and reactants required to obtain the desired polymer or copolymer product;
   c. adding a solvent chosen from aliphatic cyclic, straight and branched $C_{3-12}$ hydrocarbon solvents that will facilitate formation of a liquid/liquid biphase;
   d. setting and maintaining the reaction temperature required to obtain the desired polymer or copolymer product;
   e. controlling the pressure in the non-adiabatic reactor to retain liquid/liquid biphase allowing for maximized heat transfer to a cooling medium; and
   f. optionally monitoring at least one physical property of the reaction mixture to confirm the liquid/liquid biphasic reaction is being maintained.

BRIEF DESCRIPTION OF THE DRAWINGS

FIG. 1: Overall Heat Transfer Coefficient of the Steam Jacket as a function of reactor pressure. Cloud point pressures simulated from the PC-SAFT equation of state are also provided. Note that the dotted lines on this plot are meant to lead-the-eye only and do not represent any data or theory.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present disclosure desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, inherently contain certain errors necessarily resulting from the standard deviation found in their respective testing measurements.

Also, it should be understood that, any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations and are subject to the descriptions of the previous paragraph.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, the amounts of the components actually used will conform to the maximum of 100 percent.

Cooled (or non-adiabatic) reactors for solution polymerization are known. An increase in polymer concentration in a solution-phase polymerization process reduces the total amount of solvent circulating in the process for a given polymer production rate. This reduction in solvent flow can lead to significantly lower capital and operating costs in the process by reducing the equipment size and energy usage in the distillation, purification and reactor feed areas of the plant that are used to recycle the solvent. One method to increase polymer concentration in such reaction processes is to utilize a non-adiabatic reactor with a heat exchanger. Reactors of this type may also provide greater product design flexibility.

There are some examples of processes for polymerization in the liquid/liquid (L/L) region of the phase diagram used to decrease the viscosity of the reaction mixture, or used to allow for more efficient separation and recycling of polymer product from reusable solvent and monomer components of the reaction mixture.

We have advantageously found that, in some embodiments of this disclosure, operating a non-adiabatic reactor under conditions that allow for retention of two liquid phases during the polymerization processes allows for improved heat transfer and improved efficiency in the overall process. In addition, in some embodiments, the processes show the added advantage of allowing for higher polymer concentrations in the solvents of choice.

In some embodiments, disclosed herein are continuous processes for manufacturing a polyethylene polymer or copolymer in a liquid/liquid biphasic non-adiabatic reaction comprising the steps of
a. identifying the desired polymer or copolymer product;
b. charging a non-adiabatic reactor with starting materials and reactants required to obtain the desired polymer or copolymer product;
c. adding a solvent chosen from aliphatic cyclic, straight and branched $C_{3-12}$ hydrocarbon solvents that will facilitate formation of the liquid/liquid bi-phase;
d. setting and maintaining the reaction temperature required to obtain the desired polymer or copolymer product;
e. controlling the pressure to retain liquid/liquid bi-phase allowing for optimized heat transfer to a cooling medium; and
f. optionally monitoring at least one physical property of the reaction mixture to confirm the liquid/liquid biphasic reaction is being maintained
wherein the continuous process allows for heat transfer to the cooling medium that is improved relative to a process for making the same polymer in a single liquid phase.

Without wishing to be bound by theory it is believed that the heat exchanger partially removes the heat generated by the polymerization reaction and enables a higher polymer concentration while maintaining the required reactor temperature and compositions to achieve the desired polymer architecture. While solution polymerization reactors are typically operated in a region of the phase diagram such that a single homogeneous phase is present in the reactor, under the right conditions, the reactor pressure can be appropriately adjusted to allow phase separation to occur and two liquid phases are formed in the reactor. Under certain conditions of temperature and pressure, a polymer solution can phase separate into two distinct liquid phases, one if which is "lean" in dissolved polymer and one which is "rich" in dissolved polymer. Phase separation occurs at the lower critical solution temperature (LCST), also known as the "cloud point." Increasing the temperature, or decreasing the pressure at the cloud point leads to further phase separation. The cloud point is determined in part by the pressure, temperature, solution composition and solvent used for polymerization. It is believed that the separation of the polymer within the two phases can minimize the bulk viscosity of the reaction fluid by essentially extracting some of the polymer into the second liquid phase, and in addition, allows for more efficient heat transfer to the cooling medium relative to the single phase reaction.

Some advantages of some of the embodiments disclosed herein include reducing the cost of the heat exchangers and associated process systems, and/or allowing for higher ethylene concentrations and subsequently polymer production rates for a given cooling duty than if the reaction fluid was maintained in a single liquid phase.

In some embodiments, the methods disclosed herein improve the heat transfer to the cooling medium in a continuous process for manufacturing a polyethylene polymer or copolymer and the methods comprise the steps of
a. identifying the desired polymer or copolymer product;
b. charging a non-adiabatic reactor with starting materials and reactants required to obtain the desired polymer or copolymer product;
c. adding a solvent chosen from aliphatic cyclic, straight and branched $C_{3-12}$ hydrocarbon solvents that will facilitate formation of a liquid/liquid bi-phase;
d. setting and maintaining the reaction temperature required to obtain the desired polymer or copolymer product;
e. controlling the pressure in the non-adiabatic reactor to retain liquid/liquid bi-phase allowing for maximized heat transfer to a cooling medium; and
optionally monitoring at least one physical property of the reaction mixture to confirm the liquid/liquid biphasic reaction is being maintained.

Work on the pilot plant scale has demonstrated that polymerization in the liquid/liquid (L/L) region under adiabatic conditions has very little (if any) impact on the polymer that is produced despite the presence of two liquid phases.

Designing a non-adiabatic (cooled) reactor presents some challenges, including maintaining sufficient heat transfer between the reaction fluid and the cooling medium.

As the reactor pressure is reduced below the cloud point, higher ethylene concentrations can be used due to improved heat transfer to the cooling medium, and subsequently polymer production rates can be achieved for the same total solution rate (TSR or total mass flow to the reactor). This can be attributed to the change in the phase behavior as the pressure is reduced, changing from a single liquid phase, to 2-liquid phases, one polymer rich, and one solvent rich. The nature of each of these phases varies with pressure, becoming more enriched in polymer and solvent, respectively, as the pressure is reduced. This can lead to changes in the density and viscosity of the two liquid phases.

The change in the phase behavior can be detected through in-line optical measurements, such as near-infrared (NIR) spectroscopy. As the pressure is reduced below the cloud point, the polymer solution will change from a transparent solution to a cloudy suspension, leading to increased light scattering, demonstrated by a dramatic increase in the NIR-baseline. In addition, the changes in phase behavior can be detected using viscosity measurements, or through monitoring agitator torque to confirm the reaction is maintained in a liquid/liquid state.

The combination of the changes in the physical properties of the reaction fluid allows for improved heat transfer (cooling), and higher ethylene concentrations. FIG. 1 shows an initial increase in the overall heat transfer coefficient is observed as the steam jacket pressure is reduced below the value that is required to maintain adiabatic operation, while maintaining a constant pressure in the reactor. The heat transfer coefficient then increases gradually as the reactor pressure is reduced, while maintaining a constant steam jacket pressure. When the reactor pressure is reduced below the cloud point and the second liquid phase is formed in the reactor, there is marked increase in the heat transfer coefficient.

A continuously stirred tank reactor (CSTR)—also known as (but not limited to) a mixed or mixed flow reactor, back-mixed reactor, or constant flow stirred tank reactor (CFSTR)—is one of three typical classification methods for reactor design and modeling. The other two are a batch or semi-batch reactor (BR) and a plug flow reactor (PFR). As the name implies, a BR in its ideal form has its reactants injected at the beginning with the reaction taking place for the required period of time at which point the products are withdrawn. The BR chemical composition varies in time but is uniform throughout the reactor at any instant in time. A PFR is a continuous flow reactor typically tubular in geometry with a continuous injection of reactants at one end and products withdrawn at the other end. The PFR has a continuously varying chemical composition through its length.

A CSTR in its ideal realization is a well stirred tank with reactants continuously injected in one location and products withdrawn continuously in another location. The chemical composition within the reactor is uniform in space and time and equal to the chemical composition at the exit.

No real reactor is exactly represented by either of a CSTR, BR or PFR. These classifications are used to model in the ideal sense how a chemical reactor behaves or operates. A real reactor will be best represented conceptually by one of these three reactor types for the purposes of modeling and general understanding of their operation. The descriptions of the ideal reactor types do not necessarily describe the physical or geometric realization of a reactor. A CSTR can be a typical tank or reaction volume stirred by an impeller rotating at some speed; however, any configuration that is well mixed throughout its reaction volume with a continuous injection of reactants and withdrawal of products is within the category of CSTR. For example, a reactor composed of flow loop with sufficient circulation and internal mixing to be essentially uniform is classified as a CSTR. This loop may be composed of pump(s) or fluid motive driver(s) and any combination of piping, static mixers or tanks. All three reactors can operate with liquid, gas or multi-phase (for example, solid-liquid, liquid-liquid or liquid-gas). A CSTR as defined here can operate adiabatically or non-adiabatically.

In an adiabatic process, there is no transfer of heat: enthalpy is constant. In the adiabatic polymerization of ethylene, the reaction temperature is therefore governed by the ethylene concentration in the feed, the conversion in the reactor and the composition of the fluid. In a non-adiabatic reactor, the reaction temperature is controlled additionally through either the addition or removal of heat from the process.

In some embodiments, the reactor is an agitated reactor. In some embodiments, the reactor is an agitated reactor chosen from stirred tank, batch, plug flow, loop reactor static mixer, and static mixer in a loop. The solution polymerization process may be conducted in a stirred "reactor system" comprising one or more stirred tank reactors or in a mixed loop and stirred tank reactor system. The CSTR reactors may be cylindrical or spherical. The agitator may be chosen from auger agitators, anchor agitators, radial blade turbine, pitched blade turbine, hydrofoil impeller, or a hybrid impeller comprising one or more of these elements. In some embodiments, the reactor is a single reactor. In some embodiments, the reactor is a dual reactor system. In some embodiments, the reactor is at least a dual reactor. The reactors may be in tandem (series) or parallel operation. In some embodiments of a dual tandem reactor system, the first polymerization reactor preferably operates at lower temperature.

In some embodiments of a dual reactor system comprising a first reactor and a second reactor, the first reactor is chosen from tube reactors, CSTR, and PFR. In some embodiments, the first reactor is a non-adiabatic reactor. In some embodiments, the second reactor is a non-adiabatic reactor. In some embodiments, the second reactor is chosen from adiabatic tube, CSTR and PF.

The residence time in each reactor will depend on the design and the capacity of the reactor. Generally, the reactors should be operated under conditions to achieve a thorough mixing of the reactants. In addition, in some embodiments from 20 to 60 wt. % of the final polymer is polymerized in the first reactor, with the balance being polymerized in the second reactor. Solution phase reactors produce a single or substantially single-phase product a polymer solution typically of one or more $C_3$ to $C_{12}$ alkanes.

Solution processes for the polymerization and copolymerization of ethylene are well known in the art. In some embodiments, the solvent used in the polymerization processes is chosen from aliphatic cyclic, straight and branched $C_{3-12}$ hydrocarbon solvents. In some embodiments, the solvent used in the polymerization processes is chosen from pentane, methyl pentane, hexane, heptane, octane, cyclopentane, cyclohexane, methylcyclohexane and hydrogenated naphtha, Isopar E and mixtures thereof. In some embodiments, the solvent used in the polymerization processes is chosen from hexane, cyclohexane, decane, heptane, isohexane, and dodecane and mixtures thereof. In other embodiments, the solvent is chosen from methylpentane, cyclopentane, cyclohexane, hexane and mixtures thereof.

The polymerization temperature in a conventional slurry or solution process is from about 80 to about 300° C. (or from about 80 to about 120° C. for slurry polymerization and from about 120 to about 250° C. for solution polymerizations). As is illustrated in the Examples, in some embodiments, the polymerization temperature for the solution process disclosed herein can be above 160° C. The upper temperature limit will be influenced by considerations which are well known to those skilled in the art, such as a desire to maximize operating temperature to reduce solution viscosity, while still maintaining good polymer properties. Increased polymerization temperatures generally reduce the molecular weight of the polymer.

In other embodiments of the present disclosure, the polymerization temperature in the non-adiabatic reactor can be between about 100° C. and about 240° C., or about 120° C. and about 240° C., or between about 130° C. and about 220° C., or between about 200 and about 300° C., or between about 220 to about 250° C.

In other embodiments of the present disclosure, when the reactor system comprises at least a first and a second reactor, the first reactor may be operated at temperatures between 100° C. and 170° C. or between 150° C. and 160° C. or between 100° C. and 160° C. In some embodiments, the second reactor may be operated at temperatures between 150° C. and 250° C., or between 150° C. and 240° C., or between 175° C. and 190° C. In some embodiments, the temperature of the first reactor is between 100° C. and 170° C., or between 120° C. and 170° C. and the temperature of the second reactor is between 150° C. and 230° C., or between 150° C. and 240° C.

One example of a reaction process is a "medium pressure process," meaning that the pressure in the reactor is, for example, less than about 6,000 psi (about 41,000 kiloPascals or kPa). Pressures can range from about 10,000 to about 40,000 kPa, or from about 2,000 to about 3,000 psi (about 14,000—about 21,000 kPa), or from 400 to about 3,000 psi (about 2,800—about 22,000 kPa). In other embodiments of this disclosure, the pressure in the non-adiabatic reactor is between 2 $MPa_a$ and 17 $MPa_a$, or between 4 $MPa_a$ and 12 $MPa_a$, or between 2 $MPa_a$ and 8 $MPa_a$, or between 8 $MPa_a$ and 17 $MPa_a$.

To facilitate operation of the non-adiabatic reactor to maintain two liquid phases, as described herein, the solvent and the pressure are selected appropriately based on the operator's desired product. One of skill in the art is aware and able to select the appropriate starting reaction materials and the reactor temperature to make the target product.

Suitable monomers for copolymerization with ethylene include $C_{3-20}$ mono- and di-olefins. Example comonomers include $C_{3-12}$ α-olefins which are unsubstituted or substituted by up to two $C_{1-6}$ alkyl radicals, $C_{8-12}$ vinyl aromatic monomers which are unsubstituted or substituted by up to two substituents chosen from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

Co- and ter-polymers of ethylene, and one or more copolymerizable monomers can also be prepared using the methods described herein. In one embodiment, such polymers will contain about 50 to about 75 weight % ethylene, or about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Some examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In another embodiment, the resulting polymer may comprise not less than about 50, or not less than about 75 weight % of ethylene and up to about 50, or less than 25 weight % of one or more copolymerizable monomers. In some embodiments, the comonomers are $C_{3-8}$ alpha olefins such as 1-butene, 1-hexene and 1-octene.

The monomers may be dissolved/dispersed in the solvent either prior to being fed to the reactor (or for gaseous monomers the monomer may be fed to the reactor so that it will dissolve in the reaction mixture). Prior to mixing, the solvent and monomers may be purified to remove potential catalyst poisons such as water, oxygen and other polar impurities. The feedstock purification follows standard practices in the art, e.g. molecular sieves, alumina beds and oxygen removal catalysts are used for the purification of monomers. The solvent as well (e.g. methyl pentane, cyclohexane, hexane or toluene) may be treated in a similar manner.

The feedstock may be heated or cooled prior to feeding to the reactor.

In some embodiments, the catalyst components may be premixed in the solvent for the reaction or fed as separate streams to the reactor. In some instances, premixing it may be desirable to provide a reaction time for the catalyst components prior to entering the reaction.

One embodiment of this disclosure provides a solution olefin polymerization process comprising i) preparing a procatalyst using the processes described herein above; ii) adding the procatalyst with a solvent chosen from $C_{3-12}$ alkanes to one or more reactors in series or in parallel configuration together with ethylene and optionally one or more comonomers chosen from $C_{3-8}$ comonomers, hydrogen to a reactor; and iii) adding an aluminum alkyl activator to the reactor in a molar ratio of about 1 to about 10 relative to the amount of procatalyst.

The polymerization processes may also use an aluminum alkyl activator chosen from $R^4_y AlOR^5_{3-y}$, trialkyl aluminum compounds and MAO.

In some embodiments, the procatalyst is pre-formulated and added directly to the reactor.

In other embodiments, the polymerization process using the procatalysts described herein results in a polymer with the same density but with a higher Mw at any polymerization temperature than the Mw obtained for a polymer prepared using a procatalyst disclosed in U.S. Pat. No. 5,589,555.

The catalysts useful in the processes disclosed herein are chosen from Ziegler Natta catalysts, metallocene, or non-metallocene single site catalysts, or any combination of these catalysts in the various reactors being used in the reactor system.

In some embodiments, the reactor hold-up time is from about 30 seconds to about 1 hour. In other embodiments, the reactor hold-up time is from about 30 seconds to about 30 minutes. In other embodiments, the reactor hold-up time is from about 30 seconds to about 5 minutes. In other embodiments, the reactor hold-up time is from about 1 minute to about 5 minutes.

Another embodiment provides a polyethylene polymer or copolymer having a density from about 0.857 g/cc to about 0.970 g/cc. Another embodiment provides a $CDBI_{50}$ octene greater than or equal to about 50. Another embodiment provides a polymer with a MWD (Mw/Mn) from about 3 to about 8. Yet another embodiment provides substantially flat comonomer distribution within the final polymer product. Substantially flat comonomer distribution means that a plot of the branch content as a function of molecular weight as plotted on a GPC curve would give a line that is not more than about 15° off horizontal.

In some embodiments, the polymer has less than about 10 ppm calculated residual metal from the active catalyst in the resulting polymer. In other embodiments, the polymer has less than about 8 ppm calculated residual metal from the active catalyst in the resulting polymer. In other embodiments, the polymer has less than about 3 ppm calculated residual metal from the active catalyst in the resulting polymer.

In some embodiments, the polymer has less than about 120 ppm calculated residual halogen in the resulting polymer. In other embodiments, the polymer has less than about 100 ppm calculated residual halogen in the resulting polymer. In other embodiments, the polymer has less than about 60 ppm calculated residual halogen in the resulting polymer.

Another embodiment provides a polymer as described herein above for use in fabrication methods chosen from extrusion, injection molding, thermoforming, and rotational molding.

Another embodiment provides a polymer as described herein above for use in plastic articles, such as, films, fibers, molded or thermoformed articles, such as, drums and agricultural spray tanks, and pipe coatings.

Embodiments of the present invention will further be described by reference to the following examples. The following examples are merely illustrative and are not intended to be limiting. Unless otherwise indicated, all percentages are by weight.

EXAMPLES

Table 1a displays the results of the experiments carried out on a pilot plant scale. Poly(ethylene) homopolymer and poly(ethylene-co-1-octene) copolymer were prepared in a CSTR equipped with a steam jacket to control reaction temperature. After an adiabatic baseline was established, the steam jacket temperature was reduced by reducing the pressure of the steam. As the steam jacket temperature was reduced, the reaction temperature also decreased as the steam jacket acted as a cooler. The ethylene concentration in the feed to the reactor was then increased until the initial adiabatic reaction temperature was re-established for the lower steam jacket pressure. The reaction pressure was then reduced, at a constant steam jacket temperature and the ethylene concentration in the feed was adjusted to maintain a constant reactor temperature while monitoring the heat transfer to the steam jacket at an approximately constant temperature difference between the reactor and jacket. Hydrogen is added to the reactor for the polymerization (1 ppm, for the copolymer, and 27 ppm for the homopolymer). The amount of hydrogen was varied slightly to offset any shifts that were seen in the Ml owing to changing the ethylene concentration in the reactor.

The data shows that, for the case of liquid-liquid polymerizations, in which the reaction pressure is maintained below the cloud point, the heat transfer improves significantly. For example, for the case of an ethylene homopolymer, operating the reaction in liquid-liquid state lead to an enhancement in the overall heat transfer coefficient from 177.2 $W/m^2K$ to 340.6 $W/m^2K$, an increase of 92%.

TABLE 1a

Process conditions for ethylene octene copolymer products 1A to 1E and homopolymer products 2A to 2F, as well as phase composition data from thermodynamic simulations

|  | Product #1A | Product #1B | Product #1C | Product #1D | Product #1E |
|---|---|---|---|---|---|
| Catalyst | Ziegler-Natta | Ziegler-Natta | Ziegler-Natta | Ziegler-Natta | Ziegler-Natta |
| Solvent | SM (predominately 2-methyl-pentane) | SM (predominately 2-methylpentane) | SM (predominately 2-methylpentane) | SM (predominately 2-methylpentane) | SM (predominately 2-methylpentane) |
| MI Target | | | | 1.00 ± 0.15 | |
| Density Target | | | | 0.9200 ± 0.0015 | |
| Comonomer | 1-octent | 1-octene | 1-octene | 1-octene | 1-octent |
| Reactor Pressure ($MPa_a$) | 16.1 | 16.1 | 12.1 | 8.1 | 7.1 |
| Steam Jacket Pressure ($kPa_a$) | 1524 | 670 | 670 | 670 | 670 |
| Reactor Temperature (° C.) | 185.9 | 187.3 | 186.9 | 185.5 | 185.4 |
| Reactor ethylene % in feed (wt %) | 12.40 | 13.50 | 13.70 | 13.70 | 14.50 |
| Pcloud ($MPa_a$) | 8.1 | 8.1 | 8.0 | 7.8 | 7.7 |
| $P_{reactor} - P_{cloud}$ (MPa) | 8.0 | 8.0 | 4.1 | 0.3 | −0.6 |
| Overall Cooling UA ($W/m^2K$) | NA | 195.5 | 245.8 | 286.1 | 460.2 |
| Improvement in UA (%) | NA | NA | 26 | 46 | 135 |

TABLE 2a (Cont.): Process conditions for ethylene octene copolymer products 1A to 1E and homopolymer products 2A to 2F, as well as phase composition data from thermodynamic simulations

|  | Product #2A | Product #2B | Product #2C | Product #2D | Product #2E | Product #2F |
|---|---|---|---|---|---|---|
| Catalyst | Ziegler-Natta | Ziegler-Natta | Ziegler-Natta | Ziegler-Natta | Ziegler-Natta | Ziegler-Natta |
| Solvent | SM (predominately 2-methyl-pentane) | SM (predominately 2-methyl-pentane) | SM (predominately 2-methyl-pentane) | SM (predominately 2-methyl-pentane) | SM (predominately 2-methyl-pentane) | SM (predominately 2-methyl-pentane) |
| MI Target | 1.00 ± 0.15 | | | 10.0 ± 1.5 | | |
| Density Target | 0.9200 ± 0.0015 | | | 0.9635 ± 0.0015 | | |
| Comonomer | NA | NA | NA | NA | NA | NA |
| Reactor Pressure ($MPa_a$) | 16.1 | 16.1 | 13.1 | 11.1 | 9.1 | 8.1 |
| Steam Jacket Pressure ($kPa_a$) | 2817 | 650 | 668 | 691 | 648 | 636 |
| Reactor Temperature (° C.) | 206.4 | 205.9 | 204.7 | 205.8 | 206.6 | 206.0 |
| Reactor ethylene % in feed (wt %) | 14.65 | 16.65 | 16.65 | 17.50 | 18.00 | 18.00 |
| Pcloud ($MPa_a$) | 12.6 | 12.9 | 12.4 | 12.5 | 12.5 | 12.5 |
| $P_{reactor} - P_{cloud}$ (MPa) | 3.5 | 3.2 | 0.7 | −1.4 | −3.4 | −4.3 |

TABLE 2a-continued (Cont.): Process conditions for ethylene octene copolymer products 1A to 1E and homopolymer products 2A to 2F, as well as phase composition data from thermodynamic simulations

|  | Product #2A | Product #2B | Product #2C | Product #2D | Product #2E | Product #2F |
|---|---|---|---|---|---|---|
| Overall Cooling UA (W/m$^2$K) | NA | 177.2 | 221.2 | 315.3 | 335.8 | 340.6 |
| Improvement in UA (%) | NA | NA | 24 | 78 | 89 | 92 |

To gain further insight into the impact of phase behavior on non-adiabatic polymerization, thermodynamic simulations were performed using the PC-SAFT EOS implemented in VLXE. The results of this investigation are also summarized in Table 1b and 1c.

TABLE 3b

Phase composition data from thermodynamic simulations- Phase 1 (simulation)

|  | Prod. #1A | Prod. #1B | Prod. #1C | Prod. #1D | Prod. #1E | Prod. #2A | Prod. #2B | Prod. #2C | Prod. #2D | Prod. #2E | Prod. #2F |
|---|---|---|---|---|---|---|---|---|---|---|---|
| Mass fraction | 1.00 | 1.00 | 1.00 | 1.00 | 0.86 | 1.00 | 1.00 | 1.00 | 0.76 | 0.59 | 0.53 |
| Density (g/cm$^3$) | 0.5600 | 0.5610 | 0.5640 | 0.5367 | 0.5408 | 0.5396 | 0.5406 | 0.5333 | 0.5396 | 0.5515 | 0.5571 |
| volume fraction | 1.00 | 1.00 | 1.00 | 1.00 | 0.85 | 1.00 | 1.00 | 1.00 | 0.74 | 0.51 | 0.42 |
| Ethylene (wt %) | 1.24 | 1.35 | 1.37 | 1.37 | 1.40 | 1.34 | 1.88 | 1.66 | 1.63 | 1.50 | 1.42 |
| Octene (wt %) | 5.69 | 6.21 | 6.30 | 6.30 | 6.53 | 0.00 | 0.00 | 0.00 | 0.00 | 0.00 | 0.00 |
| Methylpentane (wt %) | 80.86 | 7.91 | 78.81 | 78.81 | 75.62 | 85.40 | 83.40 | 83.40 | 77.92 | 71.10 | 68.33 |
| Polymer (wt %) | 12.21 | 13.32 | 13.52 | 13.52 | 16.45 | 13.26 | 14.72 | 14.94 | 20.45 | 27.40 | 30.25 |

TABLE 4c

Phase composition data from thermodynamic simulations - Phase 2 (simulation)

|  | Prod. #1A | Prod. #1B | Prod. #1C | Prod. #1D | Prod. #1E | Prod. #2A | Prod. #2B | Prod. #2C | Prod. #2D | Prod. #2E | Prod. #2F |
|---|---|---|---|---|---|---|---|---|---|---|---|
| Mass fraction | 0.00 | 0.00 | 0.00 | 0.00 | 0.14 | 0.00 | 0.00 | 0.00 | 0.24 | 0.41 | 0.47 |
| Density (g/cm$^3$) | NA | NA | NA | NA | 0.4956 | NA | NA | NA | 0.4806 | 0.4649 | 0.4582 |
| Volume fraction | 0.00 | 0.00 | 0.00 | 0.00 | 0.15 | 0.00 | 0.00 | 0.00 | 0.26 | 0.49 | 0.58 |
| Ethylene (wt %) | NA | NA | NA | NA | 1.73 | NA | NA | NA | 2.14 | 2.23 | 2.23 |
| Octene (wt %) | NA | NA | NA | NA | 7.52 | NA | NA | NA | 0.00 | 0.00 | 0.00 |
| Methylpentane (wt %) | NA | NA | NA | NA | 89.68 | NA | NA | NA | 97.08 | 97.44 | 97.53 |
| Polymer (wt %) | NA | NA | NA | NA | 1.07 | NA | NA | NA | 0.78 | 0.34 | 0.23 |

What is claimed is:

1. A continuous process for manufacturing a polyethylene polymer or copolymer in a non-adiabatic liquid/liquid biphasic reaction comprising:
   identifying a desired polymer or copolymer product;
   charging a non-adiabatic reactor with starting materials and reactants required to obtain the desired polymer or copolymer product;
   adding a solvent chosen from aliphatic cyclic, straight or branched $C_{3-12}$ hydrocarbon solvents that will facilitate formation of a liquid/liquid bi-phase;
   setting and maintaining a reaction temperature required to obtain the desired polymer or copolymer product; and
   controlling a reaction pressure to retain the liquid/liquid bi-phase allowing for optimized heat transfer to a cooling medium;
   wherein the continuous process allows for heat transfer to the cooling medium that is improved relative to a process for making the same polymer in a single liquid phase and further wherein the continuous process is carried out in a dual reactor system comprising a first reactor, that is operated in either adiabatic or non-adiabatic conditions, and a second reactor that is a non-adiabatic reactor.

2. The process of claim 1 wherein the solvent is selected from pentane, methyl pentane, hexane, heptane, octane, cyclopentane, cyclohexane, methylcyclohexane and hydrogenated naphtha, or mixtures thereof.

3. The process of claim 1 wherein the solvent is chosen from methylpentane, cyclopentane, cyclohexane, hexane, or mixtures thereof.

4. The process of claim 1 wherein the temperature in the non-adiabatic reactor is between 100° C. and 240° C.

5. The process of claim 1 wherein the temperature in the non-adiabatic reactor is between 130° C. and 220° C.

6. The process of claim 1 wherein the pressure in the non-adiabatic reactor is between 2 MPa$_a$ and 17 MPa$_a$.

7. The process of claim 1 wherein the pressure in non-adiabatic reactor is between 4 MPa$_a$ and 12 MPa$_a$.

8. The process of claim 1 wherein an improvement in heat transfer to the cooling medium relative to a process for making the same polymer in a single phase is at least 20%.

9. The process of claim 1 wherein an improvement in heat transfer to the cooling medium relative to a process for making the same polymer in a single phase is at least 40%.

10. The process of claim 1 wherein the process further comprises monitoring at least one physical property of a reaction mixture to confirm the liquid/liquid biphasic reaction is being maintained.

11. The process of claim 1 wherein the first reactor is chosen from a tube reactor, a continuously stirred tank reactor (CSTR), or a plug flow reactor (PFR).

12. The process of claim 1 wherein the second reactor is chosen from an adiabatic tube, a continuously stirred tank reactor (CSTR) or a plug flow reactor (PFR).

13. The process of claim 1 wherein the temperature of the first reactor is between 100° C. and 170° C.

14. The process of claim 1 wherein the temperature of the second reactor is between 150° C. and 240° C.

15. The process of claim 1 wherein the temperature of the first reactor is between 100° C. and 170° C. and the temperature of the second reactor is between 150° C. and 240° C.

16. The process of claim 1 wherein the starting materials and reactants comprise a mixture of ethylene and at least one α-olefin and a catalyst.

17. The process of claim 16 where in the α-olefin is chosen from 1-butene, 1-hexene, or 1-octene.

18. The process of claim 16 wherein the catalyst is chosen from Ziegler Natta catalysts, metallocene, or non-metallocene single site catalysts.

19. The process of claim 10 wherein the reaction mixture is monitored using near infrared (NIR) or viscosity measurements.

* * * * *